Figure 1:
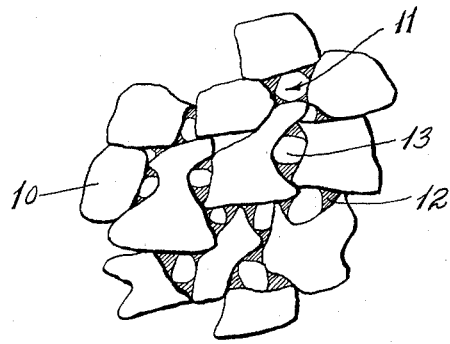

Aug. 2, 1955

C. F. TEICHMANN 2,714,578

MANUFACTURE OF PERMEABLE BARRIERS

Filed Oct. 2, 1951

INVENTOR.
CHARLES F. TEICHMANN
BY
ATTORNEYS

United States Patent Office 2,714,578
Patented Aug. 2, 1955

2,714,578

MANUFACTURE OF PERMEABLE BARRIERS

Charles F. Teichmann, Crestwood, N. Y., assignor to Texaco Development Corporation, New York, N. Y., a corporation of Delaware Application October 2, 1951, Serial No. 249,334

4 Claims. (Cl. 210—8.5)

The present invention relates to porous barriers for the diffusion and separation of fluids of different molecular weight as, for example, in the recovery of a desired material by diffusion through a porous barrier or membrane. More specifically, it concerns production of porous barriers having a uniform and controlled permeability and the use of these barriers in fluid separation or recovery as above.

In accordance with the present invention, a porous barrier material of excessive pore size is reduced to the desired permeability by distributing therethrough an immobilizable fluent liquid phase, to effect a predetermined partial saturation or permeation of the pore space. Advantage is taken of the interfacial effect at the interface between the added liquid phase and the solid porous material to effect a uniform pattern of liquid distribution. As a result the liquid permeates the pore space uniformly according to its wetting properties, occupying a predetermined portion of the internal pore spaces. Thereafter, the injected liquid is frozen or immobilized in situ leaving a relatively constricted residual portion of the pore space unoccupied to yield a predetermined pore size and permeability.

Diffusion may be practiced by passing a fluid mixture to be separated in contact with one surface of the thus prepared barrier whereby the lighter molecular weight constituents of the mixture pass preferentially through the residual pore space.

A feature of the present invention is that a number of porous solid materials otherwise unsuitable for diffusive separation by reason of their relatively high permeability are thus made effective by selectively reducing their permeability to any predetermined value.

As above indicated, permeation of the porous material by a fluid liquid introduces capillary effects which may be utilized to determine the nature and distribution of the liquid within the internal pores. For example, in the case of liquids which are non-wetting with respect to the surface of the solid porous material, the injected liquid phase must be forced into the internal pore space against the capillary pressure. As the injection pressure becomes effective, the liquid first occupies and plugs the larger openings, strongly resisting injection into the smaller capillaries. With increasing pressure of injection, the liquid is caused to encroach progressively into the more minute capillaries, thus increasingly constricting the residual unoccupied pore space.

Since the radius of curvature of the non-wetting liquid phase is constant in accordance with the laws of capillarity, the residual pore spaces which are not plugged by the introduced liquid will tend to approach uniformity of size and configuration for any degree of saturation. Therefore, by immobilizing the injected liquid in situ at a corresponding partial saturation of the internal pore space, there results a solid barrier of predetermined porosity and permeability.

Conversely, in the case of a fluid which is wetting as regards the surfaces of the porous solid, the capillary effect is reversed so that the liquid initially wets and occupies the smallest interstices of the pore space and, as the extent of saturation increases, encroaches progressively upon the more open or central portion of the pore space. As above, however, by virtue of the constant free surface curvature of the liquid phase, the residual, unoccupied pore space tends to be of uniform and regular configuration. Therefore, with a reasonably uniform starting material, the pore size in either case tends to approach uniformity.

Figure 2:
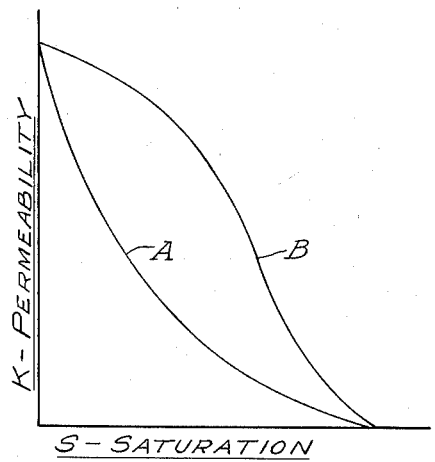

This is illustrated more or less diagrammatically in Figure 1 of the accompanying drawing wherein is shown a greatly enlarged section through a consolidated porous material. Figure 2 of the drawing represents a pair of typical curves correlating the permeability of a porous barrier with the extent of saturation of a saturant occupying the voids and thus reducing the internal pore space.

In Figure 1 the material is represented as comprising grains 10 and interstitial normally open pore spaces 11. Numeral 12 exemplifies diagrammatically the regions occupied by predetermined partial saturation of the internal pore space with a liquid which is wetting with respect to the surfaces of the solid. It is to be noted that the wetting liquid first occupies the minutest capillary regions, and, as the saturation increases, approaches the central portion of the pores. Conversely, the central portions of the largest pore space represent the region initially entered by a non-wetting liquid and which encroaches only upon the more minute capillaries as the pressure is increased to raise the extent of non-wetting phase saturation.

As above indicated, and as exemplified in the drawing, by virtue of the constant radius of curvature assumed by the liquid surface at its interface with the residual unoccupied pore space, the unoccupied pores tend to approach uniformity as to size. This is particularly so in the case of a non-wetting liquid. Therefore, non-wetting phase liquids are particularly advantageous in that after immobilization in situ the residual open pores possess a high degree of size uniformity at the predetermined permeability, without particular regard to the uniformity of the initial porous solid.

After the immobilization of the liquid phase in situ, the resulting barrier is ideally suited to the diffusive separation of fluids under the predetermined conditions of permeability. By reason of this immobility, diffusion takes place without any change in the relative saturation of the impregnating phase, at any desired and convenient rate of flow.

It is contemplated forming the barrier from any convenient consolidated porous material such as naturally occuring porous rock or cast or sintered ceramic material. Examples of naturally occuring porous solids are suitably rigid porous sandstone or limestone, while the range of integrated porous ceramics includes substantially the entire field, as for example, cast or sintered magnesia, dolomite, titanium and zirconium oxides and the like. Such products are obviously suitable at a wide range of temperatures including especially high temperatures.

For more moderate conditions of temperature, the barrier may be formed of metal powder, such as brass, tin, lead, aluminum, copper, tungsten, and many others which may be bonded into a coherent mass by sintering or the like. For example, spherical particles of brass formed by atomizing a liquid alloy of brass containing small amounts of phosphorus may be consolidated to form a barrier of substantial structural strength.

In the case of ceramic barriers, the non-wetting immobilizable liquid phase may comprise a suitable metal injectable in the free flowing, molten condition and capable of freezing to a solid at a temperature above that selected for subsequent use. For example, for diffusion operations carried out at atmospheric temperature, a low melting alloy such as Woods Metal is readily injected at convenient temperatures to partially saturate the coarse porous solid and may be caused to freeze in situ by simply cooling to ordinary temperature. In general, the group of low melting point alloys which are solid at ordinary temperatures and melt slightly thereabove usually contain bismuth, cadmium, lead and tin in various proportions, and sometimes indium and/or mercury.

Molten paraffin wax possesses somewhat similar properties in contact with a porous ceramic previously wet with water. When, however, the solid porous surfaces are clean and dry, the molten petroleum wax becomes with respect thereto an ideal wetting phase liquid and is readily absorbed as above indicated.

It is important to note that the invention is not limited to the injection of low melting point alloys since ceramic or naturally occuring porous minerals are generally amenable to higher temperatures and therefore may be injected with convenient metal temperatures, such as die-casting metal alloys, brass, lead and many others.

In the case of starting barriers formed of metal, the capillary effect encountered will manifestly depend upon the particular interfacial properties existing between the surfaces of the porous barrier and the injected liquid phase selected.

Further examples of immobilizable liquids which wet ceramic or mineral surfaces are the aqueous gel-forming liquids and cements, for example, gelatin. Actually from the foregoing it will be apparent that water may constitute the immobilizable phase in cases where the diaphragm is to be employed at temperatures below the freezing point of water in which case refrigeration may be practiced to immobilize the water and maintain a frozen, immobile condition during use.

Saturation of the barrier with immobilizable wetting phase is readily effected by virtue of the capillary attraction between the liquid and the surfaces of the solid wetted thereby. For example, a predetermined amount of molten paraffin placed in contact with a clean dry porous solid, pre-heated above the melting point of the paraffin, is directly absorbed to permeate the porous space uniformly. Advantageously, however, the porous solid is first evacuated and the amount of wetting fluid placed in contact therewith is carefully predetermined to effect the desired saturation.

Alternatively, the solid may be completely saturated with a solution of paraffin in a completely volatile solvent, such as heptane, after which the solvent is driven off by evaporation at a temperature above the melting point of paraffin leaving an internal pore space equal to the volume of heptane originally present.

In the injection of non-wetting liquids, however, it is necessary to effect the desired partial saturation by injection under pressure. For example, the coarse porous integrated solid is evacuated and immersed in the non-wetting phase liquid under high pressure. By virtue of the interfacial properties of the solid and the non-wetting liquid, the extent of saturation is dependent upon the pressure applied. Therefore, to restrict the porosity of the porous solid to any predetermined permeability, the pressure upon the immobilizable non-wetting liquid phase is simply raised to effect the degree of pore saturation required.

A convenient alternative procedure which obviates the necessity for carefully regulating the injection pressure, is to saturate the solid with a wetting liquid such as water. For example, the solid may be completely saturated with water and thereafter, the water saturation reduced to a predetermined value in a conventional air-water capillary cell. In the cell the undesired portion of water is displaced, leaving occupied by water that portion of the pores which are ultimately to be left open. The partially saturated barrier is then placed in a pressure injection unit and the residual pore space is injected to saturation with the non-wetting immobilizable liquid phase at a temperature at which fluidity prevails. Manifestly, the water being incompressible positively restricts the injected liquid to the pore spaces unoccupied by water and therefore an excess of pressure may be applied to assure complete saturation of the residual pore space. Ordinarily a pressure of about 300 p. s. i. is sufficient for this purpose.

The injected liquid is thereafter immobilized in situ as for example by freezing or otherwise setting up and the water removed by evaporation.

Thus, in Figure 2, the abscissa represents the extent of saturation by liquid, and the ordinates represent the permeability of the resulting system. The curve A is a typical correlation in the case of an injected non-wetting phase whereas curve B represents a correlation typical of an injected wetting phase liquid.

From the diagram it is apparent that non-wetting phase saturation results in a more pronounced effect upon permeability in the region where the injected quantities of the immobilizable phase are relatively small. Thus, it is effective to more greatly reduce the permeability with smaller injected quantities of liquid. This is advantageous from the standpoint of greatly reducing the size of the interior pores in the preparation of diffusion barriers requiring minute pores, and taken together with the inherent tendency for the non-wetting phase to leave free passageways of uniform size and configuration as indicated above, exemplifies the particular advantages of employing such type of liquid.

In the manufacture of a barrier in accordance with the present invention, therefore, an integrated porous material such as cast or sintered ceramic material or a sintered metal powder as above is first preferably tested to determine optimum correlations of permeability for various degrees of partial saturation. For example, in the case of a porous sandstone, successive samples are evacuated and impregnated with an immobilizable fluid at increasing saturations to obtain a curve similar to Figure 2 of the drawing. Also, each of the samples may be subjected to a test to determine the optimum saturation for the operation in question.

Thereafter, the porous material is placed in the injection chamber, evacuated and subjected to injection at the pressure thus determined. For example, a well-integrated sandstone barrier is placed in a chamber, evacuated, and then injected with fluid Woods Metal at an elevated temperature and at a pressure sufficient to result in the extent of saturation thus determined, the system cooled under pressure, the pressure released, and the excess metal removed. Thereafter, the resulting barrier may be placed in service in a diffusion cell. For example, a stream of mixed gases of different molecular weight is conveyed in contact with one surface for effecting preferential diffusion, while the lighter molecular weight constituent is recovered from the opposite surface. On the other hand, the diffusion barrier thus produced may be employed to physically separate different solutions while permitting the diffusive transmission of desired constituents thereof.

As previously intimated, the integrated structure subject to liquid injection is preferably selected for physical uniformity as regards the disposition and configuration of internal pores.

Obviously, many modifications and variations of the invention as hereinbefore set forth may be made without departing from the spirit and scope thereof, and therefore, only such limitations should be imposed as are indicated in the appended claims.

I claim:

1. In the production of porous permeable barriers for the diffusive separation of fluid mixtures comprising constituents of different molecular weight which involves providing a porous barrier of integrally consolidated, mechanically rigid solid material of relatively great permeability, injecting into the internal pore space a fluent liquid which is non-wetting with respect to the surfaces of said porous solid material and in an amount effective to partially saturate the internal pore space and leave unoccupied a residual portion of the pore space and thereafter immobilizing said liquid in situ to provide a diffusion barrier of desired relatively lesser permeability.

2. The method according to claim 1 wherein the injected liquid is a metal injected at a temperature above its melting point and is immobilized by lowering the temperature below the freezing point.

3. In the production of a porous permeable barrier of desired permeability for the diffusive separation of fluid mixtures comprising constituents of different molecular weight which comprises forming a mechanically rigid porous diaphragm of integrally consolidated, solid particles having a relatively great permeability, injecting into the internal pore space a fluent liquid which is non-wetting with respect to the internal surfaces of said porous solid material by the application of a substantial pressure sufficient to partially saturate said internal pore space, said liquid comprising a material capable of transformation from the liquid to the solid phase, and thereafter causing said liquid to immobilize as a solid phase within the occupied pore space, leaving unoccupied a residual portion of the pore space corresponding to the desired permeability.

4. A method of reducing the permeability of a porous barrier which comprises injecting into said porous barrier an amount of a non-wetting fluent liquid sufficient so as to partially fill the interstitial pore space of said barrier and causing said injected liquid to be immobilized therein to produce a porous barrier having a reduced permeability.

References Cited in the file of this patent

UNITED STATES PATENTS

| Number | Name | Date |
|---|---|---|
| 929,276 | Betts | July 27, 1909 |
| 1,081,573 | Boeck | Dec. 16, 1913 |
| 1,291,253 | Thatcher | Jan. 14, 1919 |
| 1,681,890 | Washburn | Aug. 21, 1928 |
| 2,155,016 | Kershaw | Apr. 18, 1939 |
| 2,239,800 | Vogt et al. | Apr. 29, 1941 |
| 2,361,000 | Zender | Oct. 24, 1944 |
| 2,364,713 | Hensel | Dec. 12, 1944 |
| 2,397,831 | Bellamy | Apr. 2, 1946 |
| 2,409,295 | Marvin et al. | Oct. 15, 1946 |
| 2,534,638 | Swinehart | Dec. 19, 1950 |
| 2,593,540 | Cornwell et al. | Apr. 22, 1952 |

OTHER REFERENCES

Ser. No. 288,035, Rudolph (A. P. C.), published May 18, 1943.